Jan. 6, 1953 G. W. BUNGAY 2,624,389
MAKE-READY PREPARING PRESS
Filed June 19, 1950 2 SHEETS—SHEET 1

INVENTOR.
GEORGE W. BUNGAY
BY
Morgan, Finnegan & Durham
ATTORNEYS.

Jan. 6, 1953    G. W. BUNGAY    2,624,389
MAKE-READY PREPARING PRESS
Filed June 19, 1950    2 SHEETS—SHEET 2
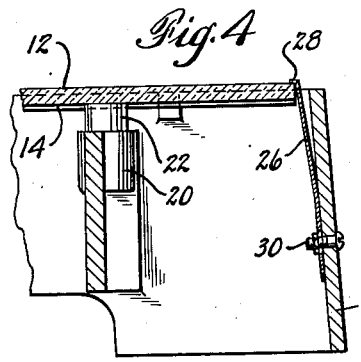
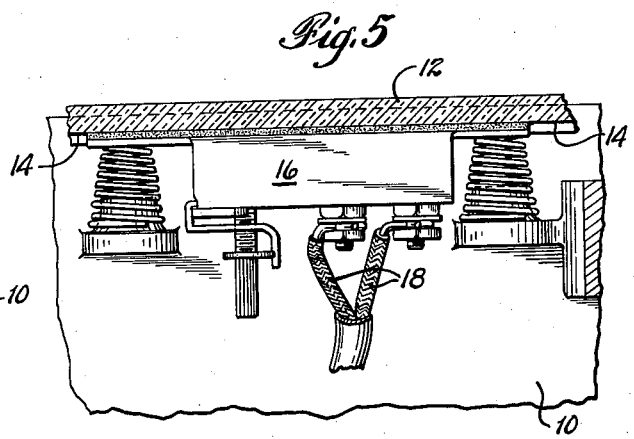
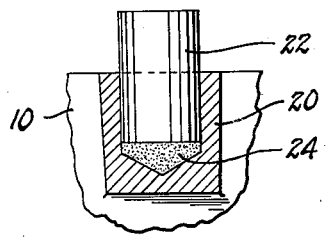
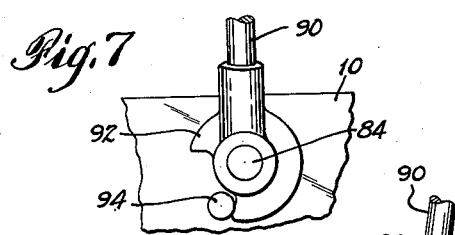
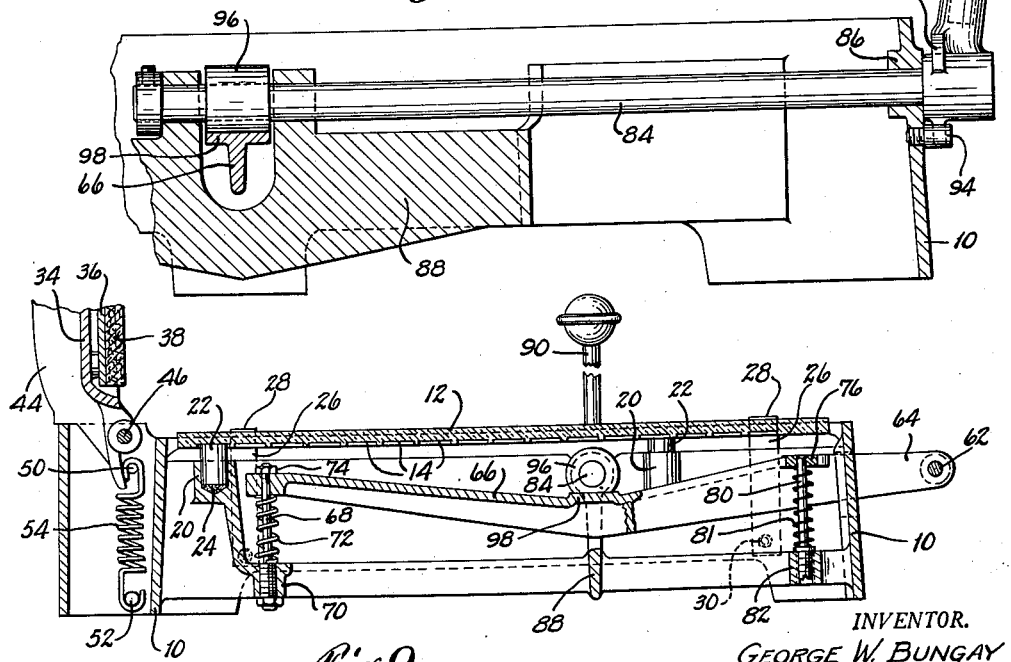
INVENTOR.
GEORGE W. BUNGAY
BY Morgan, Finnegan & Durham
ATTORNEYS.

Patented Jan. 6, 1953

2,624,389

UNITED STATES PATENT OFFICE 2,624,389

MAKE-READY PREPARING PRESS

George W. Bungay, New York, N. Y., assignor to Oxy-Dry Sprayer Corporation, New York, N. Y., a corporation of New York Application June 19, 1950, Serial No. 168,993

6 Claims. (Cl. 154—1)

The present invention relates to a novel and improved make-ready preparing press particularly adapted for the thermal consolidation of multiply or laminated made-ready sheets, such as those shown and described for instance in the prior patent to Bishop No. 2,256,921, September 23, 1941.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 2:
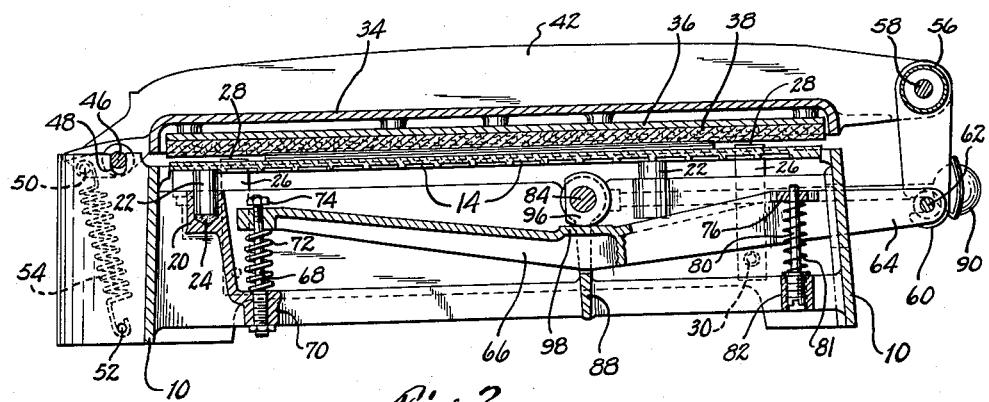
Figure 2 is a central vertical section of the press shown in Figure 1.

Figures 4, 5, 6, 7, and 8 are fragmentary detailed sectional views showing various parts of the embodied form of the present invention; and Figure 9 is a fragmentary sectional view, similar to Figure 2 but with the press in released and open position.

The present invention has for its object the provision of a novel and improved make-ready preparing press for uniformly pressing and thermally consolidating the several laminae of a multiply make-ready, such as is used in high class letterpress color printing. A further object is the provision of a novel and improved heated press which readily adapts itself automatically to widely different thicknesses of make-ready material and insures a uniform pressure on the various parts of the laminated sheet. Still another object is the provision of a make-ready press in which the platens are of simple construction, and impart uniform heat to the make-ready material pressed between them. The invention further provides a simple, relatively inexpensive press, for the purpose described, which can be heated continually, if desired, is of rugged and durable construction, and can be quickly loaded and unloaded.

An extremely satisfactory form of make-ready which is commonly used in letterpress printing is formed of several sheets of paper temporarily bonded together by a temporary adhesive, such as paraffin, and after portions of one or more of the thin sheets of paper have been cut and peeled away to form the make-ready, the assembly is permanently consolidated by heat and pressure causing the paraffin to be absorbed onto sheets of absorbent paper, such as newsprint facing the make ready sheets, at the same time that the permanent thermosetting or thermally activated adhesive between the make-ready laminae is set. Such make-ready sheets are sold in the trade under the trade-mark "Bista" and are described in detail in the prior patent to Bishop No. 2,256,921.

The make-ready press of the present invention comprises a pair of flat platens, substantially coextensive, at least one of which is heated and preferably only one of which is provided with a soft resilient surface, the platens being resiliently hinged to one another along one edge and being resiliently urged towards each other along their opposite edge by means of a releasable latch handle which is connected to a manually controlled, cam-actuated lever which is resiliently fulcrumed. The flat platens are so mounted that they are in substantial contact with each other over their entire areas when no material is between them, and are maintained parallel with substantially uniform pressure when various thicknesses of material are positioned between them. The releasable latch handle provides a simple, easily operated means by which the platens may be disengaged or the hinged one may be connected for pressing the material between them.

The heated platen is preferably formed of glass sheet material one side of which is provided with an adherent electrical resistance member constituting an elongated circuitous conductive member of a proper section and length to translate electrical energy at the available voltage into the desired quantity of heat to produce a temperature uniformly over the platen of about 300° F. Such a conductive and resistance-heating member generally comprises a thin, narrow strip of aluminum or other metal, several thousandths of an inch in thickness, less than one inch in width and usually several hundred inches in length, and adapted to operate on 115 volts to produce the desired temperature. The resistance element is so proportioned that it covers the major portion of the glass sheet, thus providing a substantially uniform temperature over the surface of the platens.

The resilient hinge at one side edge of the platen preferably allows vertical movement of one edge of the upper platen relative to the lower platen for a distance in excess of the thickness of the material to be consolidated. The manually actuated latching means for the other edge of the hinged platen is also resiliently mounted so as to allow vertical movement of the other edge of the upper platen relative to the lower platen and the two resilient means cooperate to press the upper platen firmly against the make-ready positioned between them.

It will be understood that the foregoing general description and the following detailed description as well are exemplary and explanatory of the invention but are not restrictive thereof.

Referring now in detail to the present preferred and illustrative embodiment of the invention as shown in the accompanying drawings, there is provided a base frame 10 having a substantially hollow interior and adapted to receive and support a relatively large, flat sheet of glass 12 constituting the lower platen of the press. The glass is preferably of the kind adapted to be resistance-heated, and in one form of such glass one face is channeled and provided with an elongated circuitous conductive member 14 formed of metal deposited in the channels on the glass, and connected to a terminal block 16 by which it is supplied with current at the proper voltage through the leads 18. Within the frame 10 are formed a plurality of lugs 20 each of which is recessed and receives a plug 22 forming the actual support for the heated platen 12, the plugs 22 being brought to the proper height by means of a body of cement 24 between the bottom of each plug 22 and the bottom of the recess. Also within the frame 10 are provided spring means engageable with the edge of the platen 12 for securely holding the platen down against the plugs 22, and for this purpose leaf springs 26 having bent ends 28 engage the upper face of the platen 12, the springs being secured to the side wall of the frame 10 by means of screws 30. Several such spring retaining means are provided and are positioned as desired around the edge of the platen.

The elongated circuitous conductive member 14 is preferably of substantially uniform cross section and covers the major part and almost all of the bottom face of the glass platen 12, thereby imparting a uniform heat to the entire body of the plate so as to insure a uniform heating of the make-ready sheet positioned thereon. Additional details of the resistance heating means, and the manner of its application to the glass platen are disclosed in the patent to Long 2,119,680, June 7, 1938.

An upper platen substantially coextensive with the lower platen 12 is provided and is hingedly mounted for resilient movement toward and from the platen 12 so as to accommodate different thicknesses of material between the two platens. As embodied, the upper platen comprises an open frame 34 within which is secured a relatively heavy sheet of metal 36, the under face of which is provided with a thick layer of resilient material 38 such as felt or sponge rubber, the rubber being securely cemented to the metal plate 36, and the plate 36 is secured within the frame by means of rivets 40. Strengthening ribs 42 extend across the upper face of the frame, and are provided with protuberances 44 to bear against the upper face of plate 36 and prevent excessive deflection thereof. At their rear ends the ribs 42 are provided with axially aligned hinge pins 46, which are pivotally mounted in open slots 48 formed at the rear of the frame 10. Further to the rear of the ribs 42 is provided a pin 50 between which and a pin 52 on the frame 10 is tensioned a helical spring 54 serving to partially counter-balance the upper platen, serving to hold the upper platen as shown in Figure 9, and also serving to exert a resilient downward pressure on the platen when the upper plate is in closed position as shown in Figure 2, at which time the hinge pin 46 is lifted slightly in its pivot slot 48.

At the forward edge of the frame 10, and between the forward ends of the strengthening ribs 42 is provided a handle 56 by which the upper platen may be lifted and lowered. Handle 56 is rotatably mounted in the ribs 42 by its shaft 58, and rotation of the handle 56 swings the hooks 60 into and out of engagement with the ends of a bar 62 projecting laterally from the front ends 64 of a forked lever 66 so that the forward edge of the upper platen may be pulled downwardly by force applied to the forked lever ends 66, and by rotation of the handle 56 the hooks 60 may be disengaged from the bar 62 and lever 66.

Means are provided for resiliently holding bar 62 in position to be engaged by the hooks 60, and for exerting a downward resilient force on the bar 62. For this purpose a lever 66 is mounted within the frame 10, with its forward ends 64 projecting through apertures 67 in the forward wall of the frame.

The rear end of lever 66 is apertured and slides on a vertical stud 68 which extends upwardly from bracket 70 formed as the downward extension of one of the lugs 20, and preferably integral with the frame casting 10. Between the bracket 70 and the rear end of lever 66 is provided a compression spring 72 tending to force the rear end of lever 66 upwardly against the stop nut 74.

Near the forward end of lever 66 is a crossbar 76 provided with an aperture 78 which passes over a stud 80 projecting vertically upward from a bracket 82 formed interiorly of the frame 10 and near the front edge thereof. A compression spring 81 surrounds stud 80 and seats on bracket 82 and crossbar 76. In the normal position of these parts, as shown in Figure 9, the springs 72 and 81 press the lever 66 upwardly so that latch 60 may be freely engaged and disengaged with the bar 62.

Figure 1:
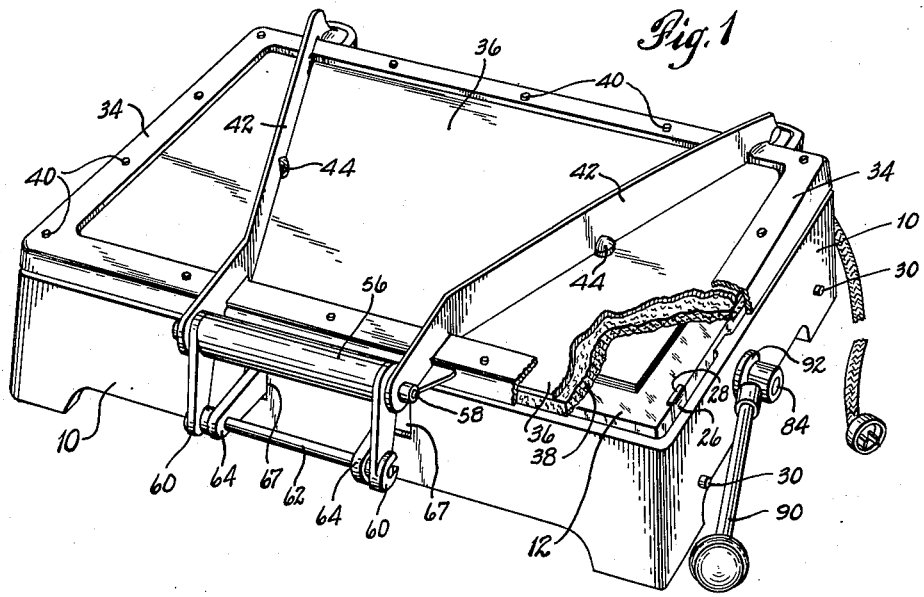
Figure 1 is a general perspective view, with certain parts broken away, of a typical, illustrative and preferred embodiment of the present invention.
Figure 3:
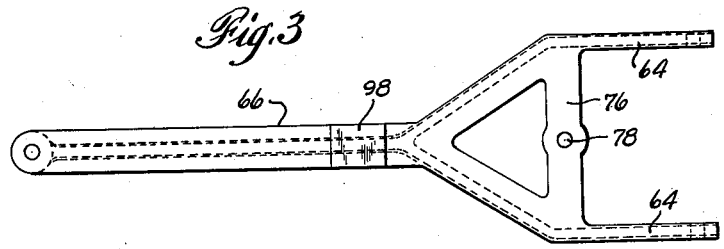
Figure 3 is a detailed bottom plan showing a lever used in the illustrated press.

Means are also provided for exerting resilient downward pressure through the latch hooks 60, and for relieving this pressure as desired, and these means preferably comprise a shaft 84 rotatably mounted in an end journal 86 on the base frame 10, and interiorly journaled in the web 88 extending from one end to the other of the frame 10. At its outer end shaft 84 is provided with a handle 90 fixed to the shaft 84, and having a cutaway flanged hub 92 which cooperates with a stop pin 94 on the frame 10 to limit rotation of the shaft 84. Near its inner end shaft 84 is provided with a cam 96 adapted to bear against a wear pad 98 formed as an intermediate portion of the lever 66, the cam being so shaped that in the upper position of lever 90 (Figure 9) springs 72 and 81 are expanded, while rotation of the lever 90 to the position shown in Figures 1 and 2 compressing springs 72 and 81 and thereby exerts resilient downward pressure on the latch members 60 and on the forward edge of the frame 34 and platen 36.

The strength of the springs 54, 72 and 80, and the spacing of the springs, and the length of the various lever arms is preferably such that a substantially equal force is exerted on the forward and rear edges of the platen 36, thereby producing a uniform pressure over the entire area between the platens 12 and 36.

Due to the vertically moveable hinge pin 46 which forms a floating or resilient connection at the rear of the platens, and a vertical movement permitted to the upper platen by the springs 72 and 80, different thicknesses of material can be accommodated between the platens. Ordinarily the make-ready sheet is approximately .008" and .0012" in thickness, and several sheets of absorbent paper, such as newsprint, may be used on one or both sides of the made-ready sheet to give added resiliency and to absorb any material exuding from the make-ready sheets. Also, more than one make-ready with its several facing sheets of absorbent paper may be placed on top of each other between the platens.

When the heating has been completed, the handle 90 is returned to its vertical position in Figure 9, the handle 56 is swung to release the latches 60 and the upper platen may be raised to free the make-ready which is then ready to be put on the press.

The invention in its broader aspects is not limited to the specific mechanisms shown and described but departures may be made therefrom within the scope of the accompanying claims without departing from the principles of the invention and without sacrificing its chief advantages.

What is claimed is:

1. A make-ready preparing press including in combination a pair of flat platens, at least one of which is heated and one of which is provided with a resilient surface, means for hingedly connecting the platen along one edge of each, the hinge connection including a spring mounted pintle allowing relative spacing of the platens, latch means adjacent the edge of each platen opposite the hinge, said latch means including resilient means urging the platens together, and lever means for energizing and releasing said resilient means whereby the hinged platen may be resiliently urged at opposite edges towards the other platen.

2. A make-ready press according to claim 1 in which the lever means acts on a bar connected to the latch means and resiliently mounted on either side of a cam actuated by the lever.

3. A make-ready press according to claim 2 in which the hinge pintle has vertical movement and the latch comprises a pivoted member engageable with the adjacent ends of the spring mounted bar.

4. A make-ready press according to claim 3 in which the upper platen is formed with a resilient facing and the lower platen is a sheet of glass having adherent resistance heater strips mounted thereon and covering a major portion of its area.

5. A make-ready press according to claim 1 in which the upper platen is formed with a resilient facing and the lower platen is a sheet of glass having adherent resistance heater strips mounted thereon and covering a major portion of its area.

6. A make-ready preparing press including in combination a pair of flat platens, at least one of which is heated and one of which is provided with a resilient surface, the platens being largely coextensive, one of the platens being hinged at one edge by resilient hinge means, a lever having a resiliently mounted fulcrum, latch means releasably interconnecting the other end of the lever and the other edge of the hinged platen and lever actuated cam means operating on the lever whereby the resilient fulcrum exerts a resilient force on said other edge of the hinged platen to force the platens resiliently towards each other.

GEORGE W. BUNGAY.

REFERENCES CITED

The following references are of record in the file of this patent:

UNITED STATES PATENTS

| Number | Name | Date |
| --- | --- | --- |
| 1,008,528 | Cruse | Nov. 14, 1911 |
| 1,450,794 | Chandler | Apr. 3, 1923 |
| 2,434,328 | McLane | Jan. 13, 1948 |
| 2,521,282 | Butler | Sept. 5, 1950 |

FOREIGN PATENTS

| Number | Country | Date |
| --- | --- | --- |
| 310,368 | Great Britain | June 5, 1930 |